United States Patent [19]

Miller et al.

[11] Patent Number: 4,599,235
[45] Date of Patent: Jul. 8, 1986

[54] MANUFACTURE OF DECORATED OVOID FIGURINES

[76] Inventors: Jack V. Miller; Ruth E. Miller, both of 700 N. Auburn Ave., Sierra Madre, Calif. 91024

[21] Appl. No.: 712,161

[22] Filed: Mar. 15, 1985

[51] Int. Cl.⁴ ............................................. A23L 1/27
[52] U.S. Cl. ..................................... 426/250; 156/61;
156/63; 156/297; 426/104; 426/298; 426/383;
428/15; 428/542.2; 446/386
[58] Field of Search ........................... 156/61, 63, 297;
248/127, 158; 428/15, 542.2; 446/385, 386;
426/104, 298, 383, 250

[56] References Cited

U.S. PATENT DOCUMENTS

| | | | |
|---|---|---|---|
| 510,085 | 12/1893 | Orth | 248/158 X |
| 1,987,528 | 1/1935 | Fukumoto | 446/385 X |
| 2,074,376 | 3/1937 | Dorcey | 426/298 X |
| 3,821,423 | 6/1974 | Jamin | 426/104 |
| 4,333,974 | 6/1982 | Davis | 426/104 X |

OTHER PUBLICATIONS

"Winky Blinky Goony Bird" Advertisement, Murray Gilbert Assoc., N.Y. (1975).

Primary Examiner—Robert A. Dawson

[57] ABSTRACT

A method for producing a decorated ovoid figurine consists of the steps of bonding the small end of a truncated cone made of decorative sheet material to the surface of an ovoid shape, such as an egg or egg-shaped object, whereby the larger end of the cone forms a stable support base for the ovoid; and bonding cut shapes of decorative sheet material representing caricatures of body parts to the surface of the ovoid, whereby it becomes a figurine.

22 Claims, 8 Drawing Figures

MANUFACTURE OF DECORATED OVOID FIGURINES

BACKGROUND OF THE INVENTION

This invention relates to decorated ovoid shapes, such as eggs, nuts, candies and other foodstuffs of the type commonly used as gifts and decorations on special holidays, such as Easter, Thanksgiving or Christmas. Presently known gift eggs and egg-shaped objects are decorated on their surfaces with combinations of dyes, waxes, paints, frostings or wrappings to make them attractive and colorful as gifts.

The purpose of the present invention is to provide decorated ovoids that have multi-dimensional decoration capable of adding improved gift value by transformation into figurines that may be used as decorations or toys that represent familiar objects or animals. It is a further purpose of this invention to provide multi-dimensional ovoid decoration materials as kits in the form of cards, so the recipient of a greeting card can produce one or more caricatures of objects or animals with relative ease.

SUMMARY OF THE INVENTION

The present invention provides the means for converting ovoid objects, such as ordinary eggs, into decorative figurines principally by cutting out and attaching a support base and other parts that are made of printed card stock. The base is generally one or more truncated cones that form a support plane with their large ends, having their small ends bonded to the surface of the egg. The combination of the printed patterns and the cut-out shapes provides a wide variety of figurines that represent caricatures of familiar objects and animals. The bases and cut-outs are provided in the form of printed card stock of either greeting cards that may be mailed to a recipient, or as kits containing the elements and instructions for a number of caricatures in a set that may be assembled by either the giver or the recipient of the figurines.

DETAILED DESCRIPTION OF THE DRAWINGS

Figure 1:
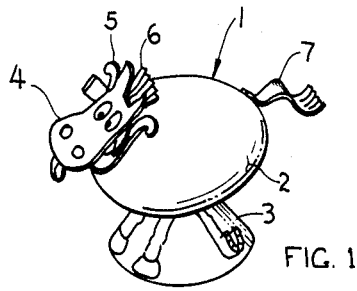
FIG. 1 is a perspective view of a figurine according to the invention and having a single truncated conical base.

In FIG. 1 a figurine 1 is shown having a generally ovoid body 2 which may comprise an egg, candy, fruit or other material of appropriate shape, attached to a truncated conical base 3, made of decorated sheet material, and supporting body parts of a caricature horse's head 4, collar 5, mane 6 and tail 7.

Figure 2:
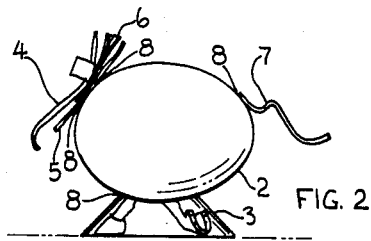
FIG. 2 is a side elevation view of the figurine with a single conical base shown in FIG. 1.

In FIG. 2 figurine 1 is shown having base 3, head 4, collar 5, mane 6 and tail 7; made of decorated sheet material, such as printed card stock, and bonded to the body 2 with a suitable adhesive 8, preferrably a non-toxic polyvinyl glue; whereby the caricature of a horse is illustrated by the figurine.

Figure 3:
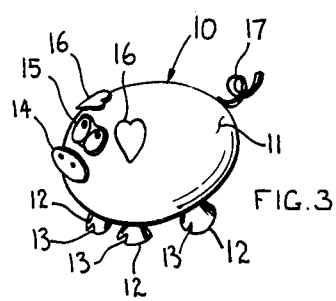
FIG. 3 is a perspective view of a figurine according to a preferred embodiment and having four truncated conical bases.

In FIG. 3 figurine 10 is shown having an ovoid body 11 attached to and supported upon a plurality of truncated cones 12 which have slits 13 to indicate split hoofs. Decorated sheet material in the form of a nose 14, eyes 15, ears 16 and a tail 17 are bonded to body 11 to construct a caricature of an animal having split hoofs.

Figure 4:
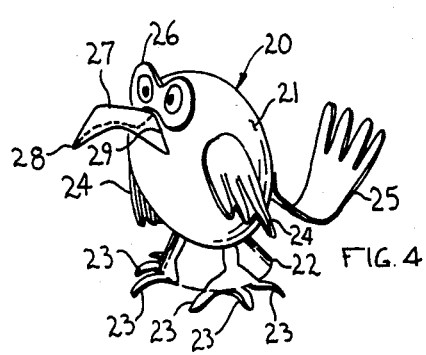
FIG. 4 is a perspective view of a figurine according to a preferred embodiment and having appendages on the base.

In FIG. 4 figurine 20 is shown having a truncated conical base 22 with appendages 23 illustrating the toes of a bird. Body parts of decorated sheet material include wings 24, a tail 25 and eyes 26 bonded to an ovoid body 21. A triangular part 27 is folded from apex 28 to base 29, and is bonded to body 21 at its base 29 to represent a bird beak.

Figure 5:
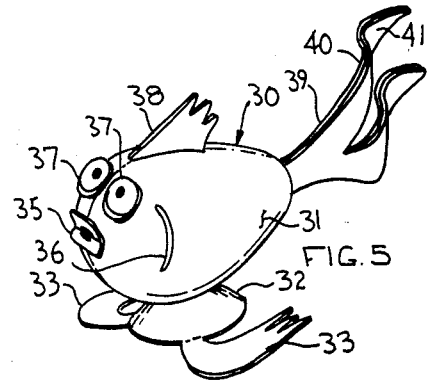
FIG. 5 is a perspective view of a figurine according to a preferred embodiment and having a plurality of cantelevered fin and tail parts.

In FIG. 5 figurine 30 is shown having a generally ovoidal body 31; shown having one pointed end typical of a body made of an almond nut. Body 31 is supported on a truncated conical base 32, made of decorated sheet material. Body 31 has attached body parts including a mouth 35, gills 36 and eyes 37. Attached as cantelevered parts are fin 38 and a tail 39 comprised of a first single-side printed sheet 40 bonded to a second single-side printed sheet 41 to form the double-sided tail for the caricature of a fish.

Figure 6:
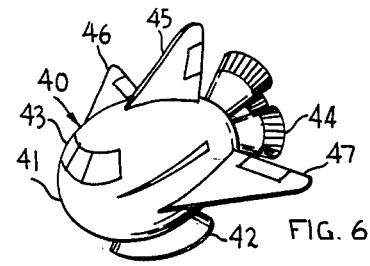
FIG. 6 is a perspective view of a figurine according to a preferred embodiment and having a plurality of centelevered empennage parts.

In FIG. 6 figurine 40 is shown having an ovoid body 41 bonded to a truncated conical base 42, and a windshield 43. Conical engines 44 are bonded as cantelevers to the end of body 41, and empennage 45 and wings 46 and 47 are also bonded as cantelevers to body 41 of a caricature of an aircraft.

Figure 7:
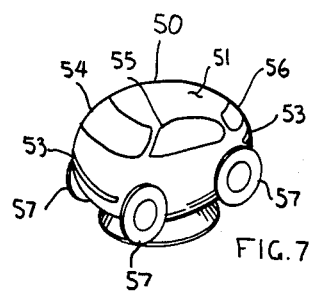
FIG. 7 is a perspective view of a figurine according to a preferred embodiment and having a plurality of wheels.

In FIG. 7 figurine 50 is shown having an ovoid body 51 bonded to a truncated conical base 52. Decorative sheet parts are bonded to body 5 in the form of bumpers 53, a windshield 54, side windows 55 and rear window 56. Circular wheels 57 are bonded to body 51 for a caricature of an automobile.

Figure 8:
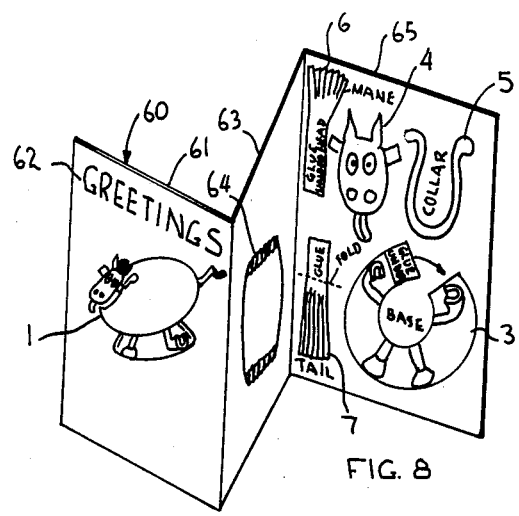
FIG. 8 is a perspective view of a figurine according to the invention shown in the form of a card, prior to assembly.

In FIG. 8 a card 60 is shown having a three panels. The front panel 61 is shown having a picture of the horse caricature figurine 1 of FIG. 1, and further has a message indication 62. The middle panel 63 is shown supporting a container of glue 64 for assembly of the figurine parts onto an egg or other ovoid body supplied by the card recipient. Glue 64 is bonded generally to the center of the panel to avoid damage during stamp cancellation if the card is mailed. The back panel 65 is provided with the decorative parts to make figurine 1, including the base 3, head 4, collar 5, mane 6 and tail 7, as shown in FIG. 1; whereby the recipient can cut out the parts from panel 64 and produce the figurine shown on panel 61, using the glue on panel 63.

Another alternate embodiment of the invention provides the decorative parts each having a frangible perforated perimeter, permitting the user to snap the individual parts out of the card.

Yet another alternate embodiment of the invention provides the part bonding means as local areas of peel-and-stick adhesive.

We claim:

1. A method for producing a decorated ovoid figurine consisting of the steps of:
   (a) providing an ovoid body in an edible, egg-shaped form;
   (b) providing a base including at least one truncated cone having a large bottom end and a small top end, fabricated of a decorative sheet material;
   (c) bonding the small end of the truncated cone to the surface of the ovoid, using a suitable bonding means;
   (d) providing cut shapes of decorative sheet material; and
   (e) bonding the cut shapes to the surface of the ovoid to form figurine features, using a suitable bonding means.

2. A method for producing a decorated ovoid figurine according to claim 1 in which the ovoid body is a hard-boiled egg of a bird.

3. A method for producing a decorated ovoid figurine according to claim 1 in which the ovoid body is a piece of egg-shaped candy.

4. A method for producing a decorated ovoid figurine according to claim 1 in which the ovoid body is a generally egg-shaped food product.

5. A method for producing a decorated ovoid figurine according to claim 1, 2, 3 or 4 in which the ovoid body is colored.

6. A method for producing a decorated ovoid figurine according to claim 1, 2, 3 or 4 in which the decorated sheet material is comprised of printed card stock.

7. A method for producing a decorated ovoid figurine according to claim 1, 2, 3 or 4 in which the decorated sheet material is provided in at least one panel of a printed card.

8. A method for producing a decorated ovoid figurine according to claim 1, 2, 3 or 4 in which the decorated sheet material is provided in at least one panel of a printed card and the bonding means is a container of adhesive attached to one panel of the printed card.

9. A method for producing a decorated ovoid figurine according to claim 1, 2, 3 or 4 in which the decorated sheet material is provided in at least one panel of a printed card and the bonding means is a container of adhesive attached near the center of one panel of the printed card.

10. A method for producing a decorated ovoid figurine according to claim 1, 2, 3 or 4 in which the decorative sheet material of the base and cut shapes is provided in at least one panel of a printed card in which cutting and folding lines, and bonding locations to produce the figurine are integral to the card.

11. A method for producing a decorated ovoid figurine according to claims 6, 7, 8, 9 or 10 in which the decorative sheet material is provided for more than one figurine on a single sheet of printed card stock.

12. A method for producing a decorated ovoid figurine according to claim 1 in which the suitable bonding means is a non-toxic, water-based polyvinyl glue.

13. A method for producing a decorated ovoid figurine according to claim 1 in which the cut shapes are caricatures of body portions of animals.

14. A method for producing a decorated ovoid figurine according to claim 1 in which a truncated cone forming the base has a plurality of elongated appendages.

15. A method for producing a decorated ovoid figurine according to claim 1 in which the base comprises a plurality of truncated cones forming animal leg caricatures.

16. A method for producing a decorated ovoid figurine according to claim 1 in which the cut shapes partially include a triangular part folded from apex to base in an acute angle, with the base bonded to the ovoid body.

17. A method for producing a decorated ovoid figurine according to claim 1 in which the cut shapes partially include a pair of single-sided printed sheets which are bonded together on their unprinted sides and are bonded to the ovoid body on one of the printed surfaces.

18. A method for producing a decorated ovoid figurine according to claim 1 in which the cut shapes include a plurality of circular wheel portions of a caricature of a wheeled vehicle.

19. A method for producing a decorated ovoid figurine according to claim 1 in which the cut shapes include a plurality of cantalever-mounted empennage and wing parts bonded to the surface of the ovoid body in a caricature of an aircraft.

20. A method for producing a decorated ovoid figurine according to claim 1 in which the cut shapes include a plurality of cantalever-mounted wings and tail parts bonded to the surface of the ovoid body in a caricature of bird.

21. A method for producing a decorated ovoid figurine according to claim 1 in which the cut shapes include a plurality of cantalever-mounted fins and tail parts bonded to the surface of the ovoid body in a caricature of fish.

22. A method for producing a decorated ovoid figurine according to claim 15 in which the truncated cones are provided with an axial slit portion representing the toe separation on a cloven-hoofed animal.

* * * * *